US008630205B2

(12) United States Patent
Chou et al.

(10) Patent No.: US 8,630,205 B2
(45) Date of Patent: Jan. 14, 2014

(54) APPARATUS AND METHOD FOR ENABLING DISCOVERY OF WIRELESS DEVICES

(75) Inventors: Chun-Ting Chou, Taipei (TW); Hongqiang Zhai, Ossining, NY (US); Richard Chen, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 814 days.

(21) Appl. No.: 12/812,638

(22) PCT Filed: Jan. 17, 2008

(86) PCT No.: PCT/IB2008/050163
§ 371 (c)(1),
(2), (4) Date: Aug. 23, 2010

(87) PCT Pub. No.: WO2008/087600
PCT Pub. Date: Jul. 24, 2008

(65) Prior Publication Data
US 2011/0013611 A1    Jan. 20, 2011

Related U.S. Application Data

(60) Provisional application No. 60/885,178, filed on Jan. 16, 2007.

(51) Int. Cl.
*H04L 12/28* (2006.01)
(52) U.S. Cl.
USPC ............................ 370/254; 370/338; 455/63.4

(58) Field of Classification Search
None
See application file for complete search history.

(56) References Cited

U.S. PATENT DOCUMENTS

| | | | |
|---|---|---|---|
| 2001/0036843 A1 | 11/2001 | Thompson | |
| 2005/0177639 A1 | 8/2005 | Reunamaki | |
| 2006/0223573 A1* | 10/2006 | Jalali | 455/552.1 |
| 2007/0286136 A1* | 12/2007 | Rittle et al. | 370/338 |
| 2008/0002632 A1* | 1/2008 | Pandey et al. | 370/338 |

FOREIGN PATENT DOCUMENTS

| | | | |
|---|---|---|---|
| EP | 1641180 A1 | 3/2006 | |
| WO | WO2005076543 A1 | 8/2005 | |

\* cited by examiner

*Primary Examiner* — Kevin C Harper
(74) *Attorney, Agent, or Firm* — Larry Liberchuk (57) ABSTRACT

A method and apparatus discover hidden wireless devices in a wireless network using a directional antenna system, preventing partitioning of the wireless network. A first wireless device located in a first antenna sector is joined in response to an initial first beacon. First beacons are received from the joined first wireless device during corresponding first beacon periods. At least a second antenna sector is scanned during at least one first beacon period to listen for second beacons from a second wireless device in the second antenna sector, while remaining joined with the first wireless device. The first beacons are not received while the second antenna sector is scanned. The second wireless device is joined in response to an initial second beacon. Second beacons are then received from the joined second wireless device during corresponding second beacon periods, and the first beacons are received during the corresponding first beacon periods.

15 Claims, 5 Drawing Sheets

APPARATUS AND METHOD FOR ENABLING DISCOVERY OF WIRELESS DEVICES

CROSS REFERENCE TO RELATED APPLICATION

A claim of priority is made to U.S. Provision Application No. 60/885,178, filed Jan. 16, 2007, the subject matter of which is hereby incorporated by reference.

BACKGROUND AND SUMMARY

Advancements continue to be made in wireless communications technology. For example, wireless local area networks (WLANs) and wireless personal area networks (WPANs) networks are becoming more common in homes and businesses. Such networks may include a variety of independent wireless electronic devices or terminals, which wirelessly communicate with one another. WLANs and WPANs may operate according to a number of different available standards, including IEEE standards 802.11 (Wi-Fi), 802.15 (Bluetooth) and 802.16 (WiMax), as well as the WiMedia Alliance Ultra-Wideband (UWB) standard.

Figure 1:
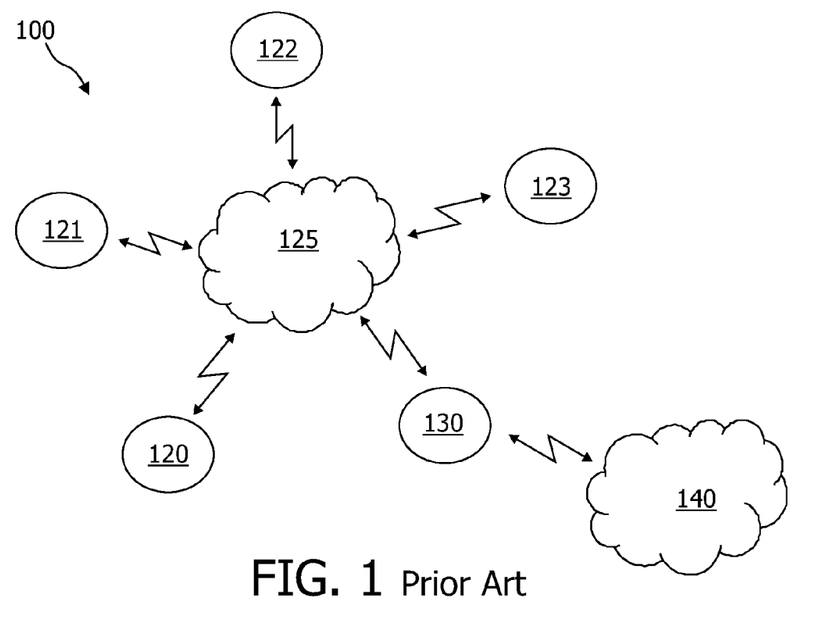
FIG. 1 is a block diagram of a conventional wireless communications network.

FIG. 1 is a block diagram showing a conventional wireless network 100, including multiple terminals configured to communicate with one another over exemplary WPAN 125. The wireless terminals may include any electronic devices or nodes configured to communicate with one another. For example, FIG. 1 depicts a home network in which the electronic devices include a personal computer 120, a digital television set 121, a digital camera 122 and a personal digital assistant (PDA) 123. The network 100 may also include an interface to other networks, such as modem 130, to provide connectivity of all or some of the wireless devices 120-123 to the Internet 140, for example. Of course, there are many other types of wireless networks in which electronic devices communicate with one anther, including networks in manufacturing plants, medical facilities, security systems, and the like.

Wireless devices may communicate with one another using directional antennas, which extend transmission range. For example, recent wireless networks operate in very high frequency bands (e.g., 60 GHz), and thus use directional antennas to compensate for high path loss associated with high frequency bands. In both centralized and distributed wireless networks, wireless devices using directional antennas must align their respective antennas at the same time in order to communicate. In other words, the wireless devices must first find each other, which is accomplished by the wireless devices scanning (e.g., sweeping their antenna beams) around surrounding areas. However, the wireless devices may not discover one another unless there is pre-coordination among them to assure that they are sweeping their antenna beams at the same time.

Beacons are widely used to convey important control information between devices. Beacons are usually broadcast so that all devices in the transmission range of the beaconing device can receive the beacons. For example, an IEEE 802.11 access point periodically sends out beacons so that the IEEE 802.11 wireless devices around the access point can associate with the access point and communicate. As stated above, in wireless networks in which directional antennas are used, beacons may only be sent in certain directions. As a result, only a limited number of devices in proximity of the beaconing device will receive the beacons, thus making beacons less useful. The wireless devices may be pre-programmed to know the direction of each other's antennas, but this requires a protocol to coordinate the wireless devises' antenna directivity, as well as beacon transmission, reception and processing.

In other words, wireless devices may not be able to discover and communicate with each other even though they are in the same network 100 and in proximity to one another. Such coordination or synchronization is difficult and costly to implement. However, wireless devices not having a common time-domain reference point for coordinating antenna control and/or beacon transmission will not communicate properly as a network.

Accordingly, it would be desirable to provide a wireless device and method of wireless communications that provides a mechanism enabling wireless devices to find and communicate with each other, particularly when the wireless devices are using directional antenna systems.

In one aspect of the invention, a method is provided for discovering hidden wireless devices in a wireless network using a directional antenna system, preventing partitioning of the wireless network. The method includes joining a first wireless device located in a first antenna sector in response to an initial first beacon received from the first wireless device; receiving multiple first beacons from the joined first wireless device during corresponding first beacon periods; and scanning at least a second antenna sector during at least one first beacon period of the first beacon periods to listen for second beacons from a second wireless device in the second antenna sector, while remaining joined with the first wireless device. The first beacons are not received while at least the second antenna sector is scanned.

The method may further include sending multiple first response beacons to the joined first wireless device in response the received first beacons. The first response beacons are not sent while scanning at least the second antenna sector.

The method may further include receiving an initial second beacon from the second wireless device while scanning the second antenna sector; joining the second wireless device in response to the initial second beacon; and receiving multiple second beacons from the joined second wireless device during corresponding second beacon periods. At least a portion of the first beacons continues to be received.

When the first beacon periods occur at different times than the second beacon periods, the method may further include receiving each of the first beacons and the second beacons. When the first beacon periods occur at the same times as the second beacon periods, the method may further include alternating between receiving the first beacons and the second beacons.

The method may further include sending multiple second response beacons to the joined second wireless device in response the received second beacons. When sending the first response beacons occurs at the same times as the second beacon periods, the method may further include alternating between sending the first response beacons and receiving the second beacons. When sending the second response beacons occurs at the same times as the first beacon periods, the method may further include alternating between sending the second response beacons and receiving the first beacons.

The method may further include scanning at least a third antenna sector during one first beacon period of the multiple first beacon periods and one second beacon period of the multiple second beacon periods to listen for third primary beacons, while remaining joined with the first wireless device and the second wireless device. The first beacons and the second beacons may not be received while the third antenna sector is being scanned. Scanning the second antenna sector may include sweeping a beam of the directional antenna system.

In accordance with a representative embodiment, an apparatus is provided for communicating with multiple wireless devices through a wireless network, where the apparatus is initially joined with a first wireless device located in a first antenna sector of multiple antenna sectors. The apparatus includes a directional antenna system, a transceiver and a processor. The directional antenna system is configured to communicate over the wireless network in the antenna sectors. The transceiver is configured to receive multiple first beacons from the joined first wireless device via the antenna system during corresponding first beacon periods. The processor is configured to control the antenna system to scan at least a second antenna sector of the antenna sectors during at least one first beacon period of the first beacon periods to listen for beacons from the wireless devices. The first beacons are not received while the directional antenna system is scanning, and the apparatus remains joined with the first wireless device.

The transceiver may receive an initial second beacon from a second wireless device located in the second antenna sector while the antenna system is scanning, enabling the apparatus to join with the second wireless device. The transceiver may also receive multiple second beacons from the joined second wireless device during corresponding second beacon periods, while continuing to receive at least a portion of the first primary beacons. The antenna system may include one of an antenna array or a steerable antenna.

When the first beacon periods occur at different times than the second beacon periods, the transceiver may receive each of the first primary beacons and the second primary beacons. When the first beacon periods occur at the same times as the second beacon periods, the transceiver may alternate between receiving the first primary beacons and the second primary beacons.

The transceiver may send multiple first response beacons to the joined first wireless device in response the received first beacons and send multiple second response beacons to the joined second wireless device in response the received second beacons. The first response beacons may not be sent while the antenna system scans the antenna sectors. When sending the first response beacons occurs at the same times as the second beacon periods, the transceiver may alternate between sending the first response beacons and receiving the second beacons. When sending the second response beacons occurs at the same times as the first beacon periods, the transceiver may alternate between sending the second response beacons and receiving the first beacons.

In accordance with a representative embodiment, a method is provided for enabling a secondary wireless device to discover multiple primary wireless devices through a wireless network, where activation schedules of the secondary wireless device and the primary wireless devices are not synchronized. The method includes receiving first primary beacons from a first primary wireless device in a first antenna sector and sending first secondary beacons to the first primary wireless device in response; skipping receiving the first primary beacons from the first primary wireless device; and scanning other antenna sectors and listening for additional primary beacons while skipping receiving the first primary beacons. The method also includes receiving an initial second primary beacon from a second primary wireless device in a second antenna sector while scanning the antenna sectors and sending an initial second secondary beacon to the second primary wireless device in response; and receiving second primary beacons from the second primary wireless device and sending secondary beacons to the second primary wireless device in response, in addition to receiving the first primary beacons from a first primary wireless device and sending the first secondary beacons to the first primary wireless device in response.

The first primary beacons may be received during a first time period and the second primary beacons may be received during a second time period. When the first time period conflicts with the second time period, the method further includes alternating receiving the first primary beacons and the second primary beacons.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

In the various embodiments, a protocol for controlling beacons, sent and received through directional antennas of wireless devices in a wireless network, such as a WLAN or WPAN. The protocol provides wireless devices the ability to transmit beacons in a coordinated manner in a WLAN or WPAN using directional antennas. The wireless devices are thus able to exchange information via beacons, either directly or indirectly, to enable network management, data transmission and other communications, without having to previously coordinate antenna directivity or time synchronization of the wireless devices.

Figure 2:
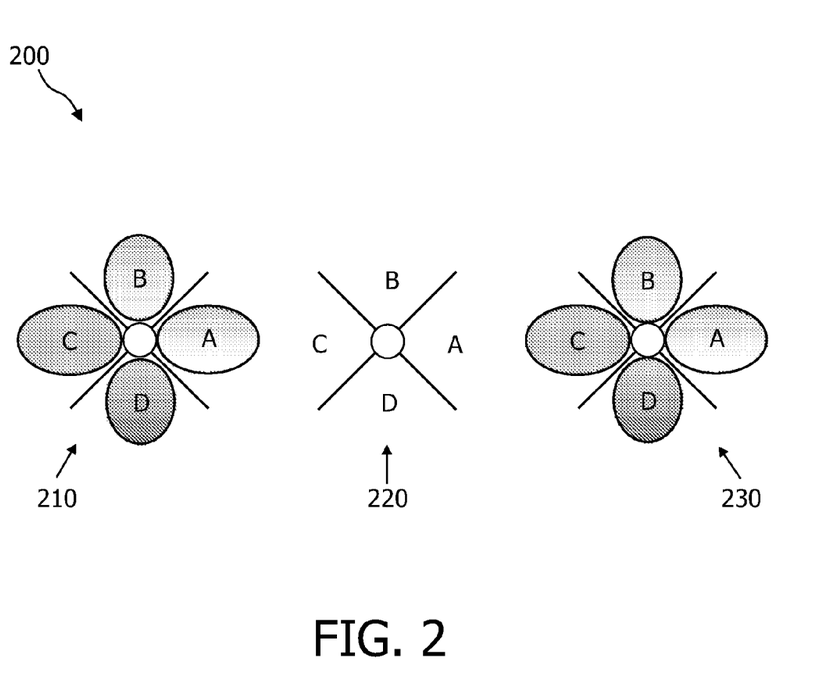
FIG. 2 is a block diagram of representative primary devices communicating with a second device in a wireless network according to various embodiments.

FIG. 2 is a block diagram of a representative wireless network 200, which may be a WLAN, WPAN, or the like, according to various standards and protocols. Each representative wireless device 210, 220, 230 of wireless network 200 transmits and receives beacons through directional antennas. For example, each wireless device 210, 220, 230 may use a switching-beam antenna or a steering antenna, in order to cover a wide area by beam sweeping/switching. However, lack of coordination in beam sweeping among the wireless devices 210, 220 and 230 may cause hidden-node problems, effectively partitioning the network, which would otherwise be well connected.

In FIG. 2, wireless devices 210 and 230 are indicated to be primary devices and wireless device 220 is indicated to be a secondary wireless device. For purposes of discussion, the distinction between primary and secondary devices is that the primary devices (e.g., wireless device 210, 230) initiate communications over network 200 by sending beacons, indicated by shaded regions A, B, C and D, which represent antenna sectors. The secondary devices (e.g., wireless device 220) receive and respond to the primary device beacons. The representative primary devices 210 and 230 may be network access points, for example, and the representative secondary device 220 may include any type of device configured to communicate over the wireless network 200, such as a personal computer, a digital television set, a digital camera and a PDA, and the like, as discussed above.

The location and direction of the wireless devices 210, 220 and 230 are not known a priori by one another. Therefore, upon powering up (or entering the network 200), wireless device 210, for example, does not know the location of the other devices (e.g., wireless device 220) or in which direction to point its antenna to establish communications with the other devices. When primary device 210 receives no beacons after scanning for a period of time,(e.g. one superframe), it attempts to discover other wireless devices by sending beacons in each of its beams or antenna sectors. FIG. 2 depicts wireless device 210, as well as wireless devices 220 and 230, as having four antenna sectors for purposes of discussion. It is understood that each of these devices may have any number of antenna sectors, without departing from the spirit and scope of the various embodiments. Also, the wireless devices 210, 220 and 230 do not need to know the number or locations of the antenna sectors of the other devices.

Wireless device 210 sends beacons in all four of its beams, indicated by shaded sector regions A-D. Wireless device 220 subsequently powers on (or otherwise enters the network 200) and begins scanning its corresponding antenna sectors A-D. Because wireless device 210 is actively sending beacons, wireless device 220 receives a primary beacon in its antenna sector C, sent by wireless device 210 in its antenna sector A.

Wireless device 220 responds by sending a secondary beacon to wireless device 210 in the opposite direction, thus joining wireless device 210.

When wireless device 230 powers on (or otherwise enters the network 200), it also begins scanning its corresponding sectors A-D. Wireless device 230 may not be able to receive (hear) the primary beacons sent from wireless device 210, for example, due to path loss, low signal strength, signal interference, obstructions, or the like. Accordingly, wireless device 230 will begin sending its own primary beacons in all four of its antenna sectors A-D. However, in a conventional system, wireless device 220, which is in closer proximity to wireless device 230, will not hear the primary beacons sent from wireless device 230 because its antenna is positioned in the opposite direction, away from wireless device 230 (e.g., in sector C of wireless device 220). As a result, the network 200 is partitioned, since wireless device 230 is unable to communicate with wireless devices 210 and/or 220.

Figure 3:
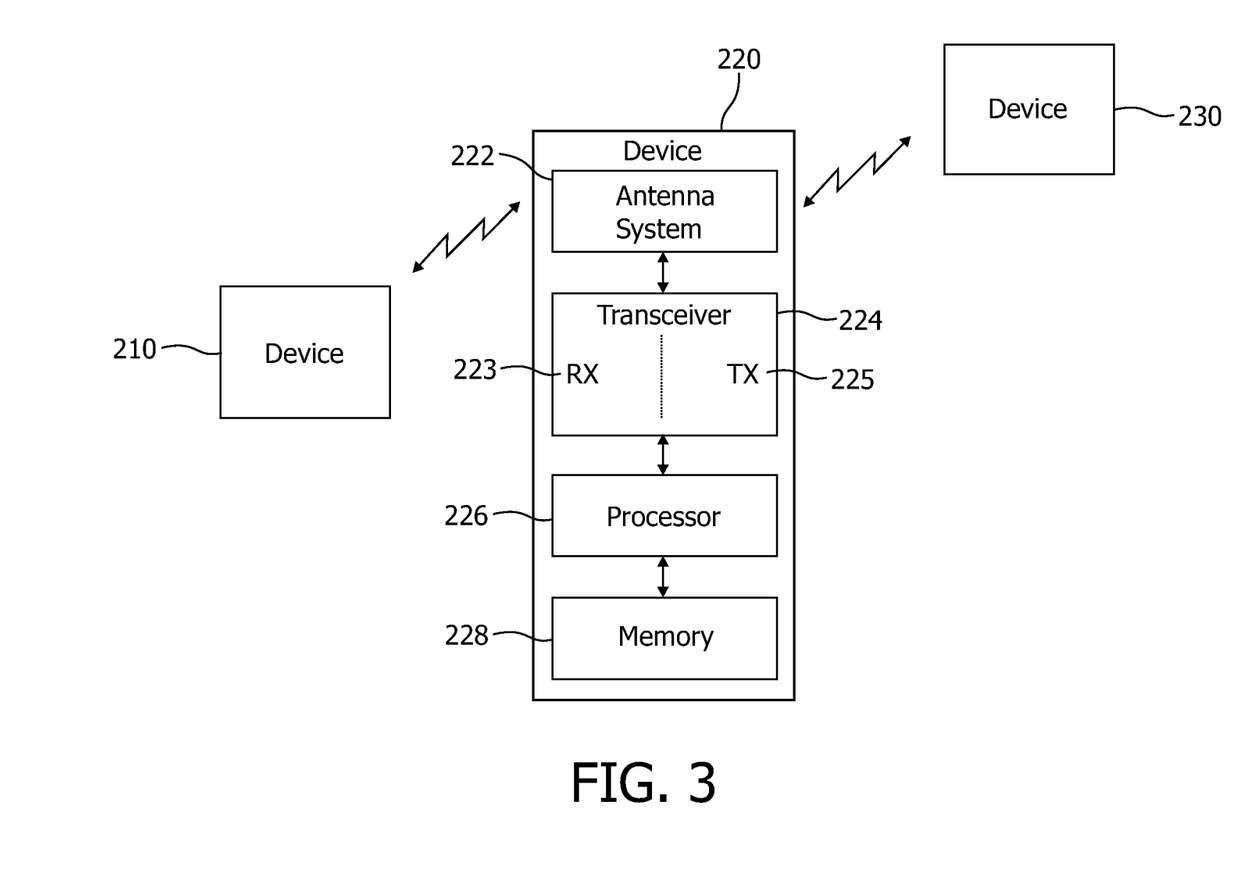
FIG. 3 is a functional block diagram of a representative wireless device according to various embodiments.

In order to avoid partitioning the network 200, wireless device 220 executes a discovery algorithm, according to embodiments of the present invention, enabling wireless device 230 to join wireless devices 210 and 220 after they have established a communication session. More particularly, wireless device 220 skips transmission of its secondary beacon to wireless device 210 in order to listen for and receive beacons from new primary device(s) (e.g.,. wireless device 230). Wireless device 220 will send responsive secondary beacons to any new primary devices and, when necessary, alternate secondary beacon transmissions in different antenna sectors to avoid conflicts with receiving/sending beacons with wireless device 210. FIG. 3 is a functional block diagram of representative secondary wireless device 220, configured to communicate with representative primary wireless devices 210 and 230, according to various embodiments, over the wireless network 200. Although wireless device 220 is shown and discussed in detail, it is understood that the wireless devices 210 and 230 are configured and function in substantially the same manner as wireless device 220. It is further understood that each of the wireless devices 210, 220, 230 may function as primary or secondary devices, depending on its configuration and/or which device is sending primary beacons for discovering other wireless devices.

As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Wireless device 220 includes transceiver 224, processor 226, memory 228, and antenna system 222. Transceiver 224 includes a receiver 223 and a transmitter 225, and provides functionality for wireless device 220 to communicate with other wireless devices, such as wireless devices 210 and 230, over wireless communication network 200 according to the appropriate standard protocols.

Processor 226 is configured to execute one or more software algorithms, including the discovery algorithm of the embodiments described herein, in conjunction with memory 228 to provide the functionality of wireless device 220. The discovery algorithm may be software control of antenna system 222, for example, implemented in the medium access control (MAC) layer. Processor 226 may include its own memory (e.g., nonvolatile memory) for storing executable software code that allows it to perform the various functions of wireless device 220, discussed herein. Alternatively, the executable code may be stored in designated memory locations within memory 228.

In FIG. 3, antenna system 222 includes a directional antenna system which provides a capability for the primary device 220 to select from multiple antenna beams for communicating with other wireless devices in multiple directions. For example, antenna system 222 may include multiple antennas, each corresponding to one antenna beam, or antenna system 222 may include a steerable antenna or antenna array that can combine multiple different antenna elements to form a beam in different directions.

The antenna system 222 operates various sectors corresponding to the directions in which the antenna system 222 may be directed. For example, a kth wireless device has the capability to transmit and receive signals in $M_k$ directions or sectors. As stated above, these sectors may be generated using a sectorized antenna, which selects among $M_k$ directional antennas of the antenna system 222, or may be virtually formed using adaptive antenna arrays of the antenna system 222.

As previously mentioned, different devices (e.g., primary devices 210, 230 and secondary device 220) may have different numbers and distributions of antenna sectors, and it is not necessary that all directions are covered by the various sectors of one device. For example, FIG. 2 depicts an example in which the antenna system 222 of wireless device 220 defines four antenna sectors, sectors A, B, C and D. For purposes of simplifying explanation, the representative sectors A-D are evenly distributed in four quadrants surrounding wireless device 220 (as well as wireless devices 210 and 230) and are depicted in two dimensions. Actual sectors may have differing and/or overlapping coverage extending in three dimensions. Also, in the depicted illustrative configuration, wireless device 210 and/or 230 may include a fixed directional antenna directed to one sector, in which wireless device 220 is located.

Figure 4A:
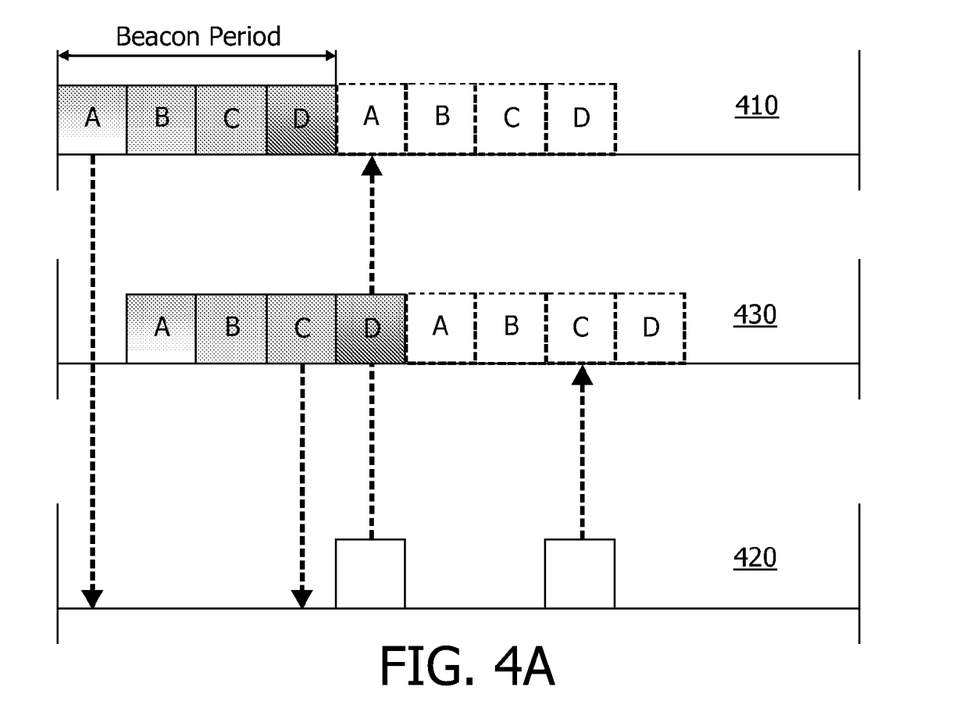
FIGS. 4A-4C are block diagrams of beacon periods of wireless devices according to an embodiment.
Figure 4B:
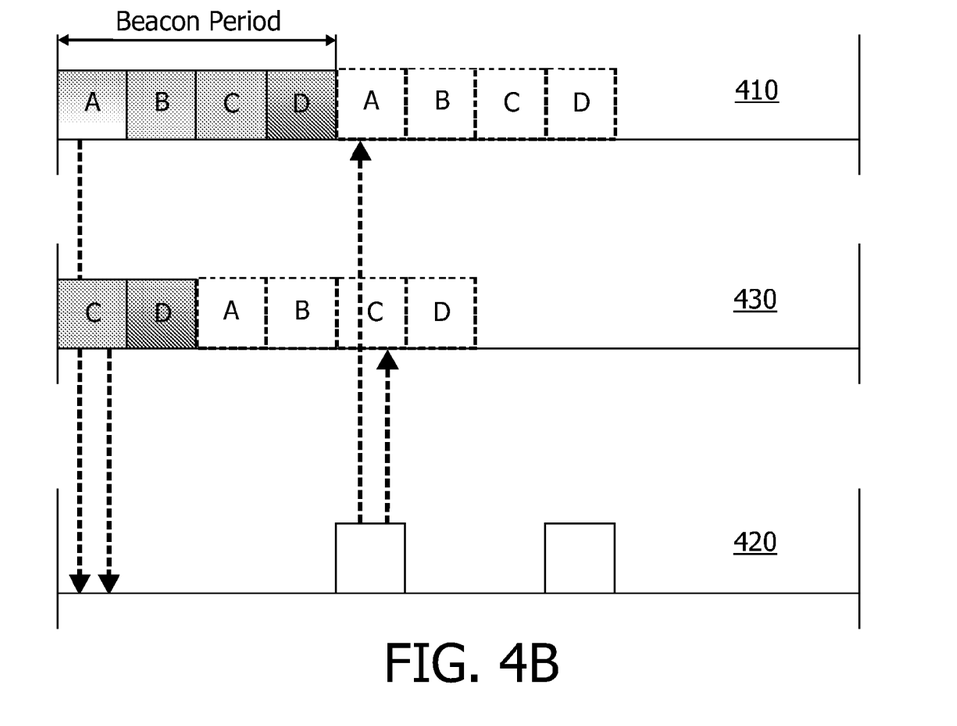
Figure 4C:
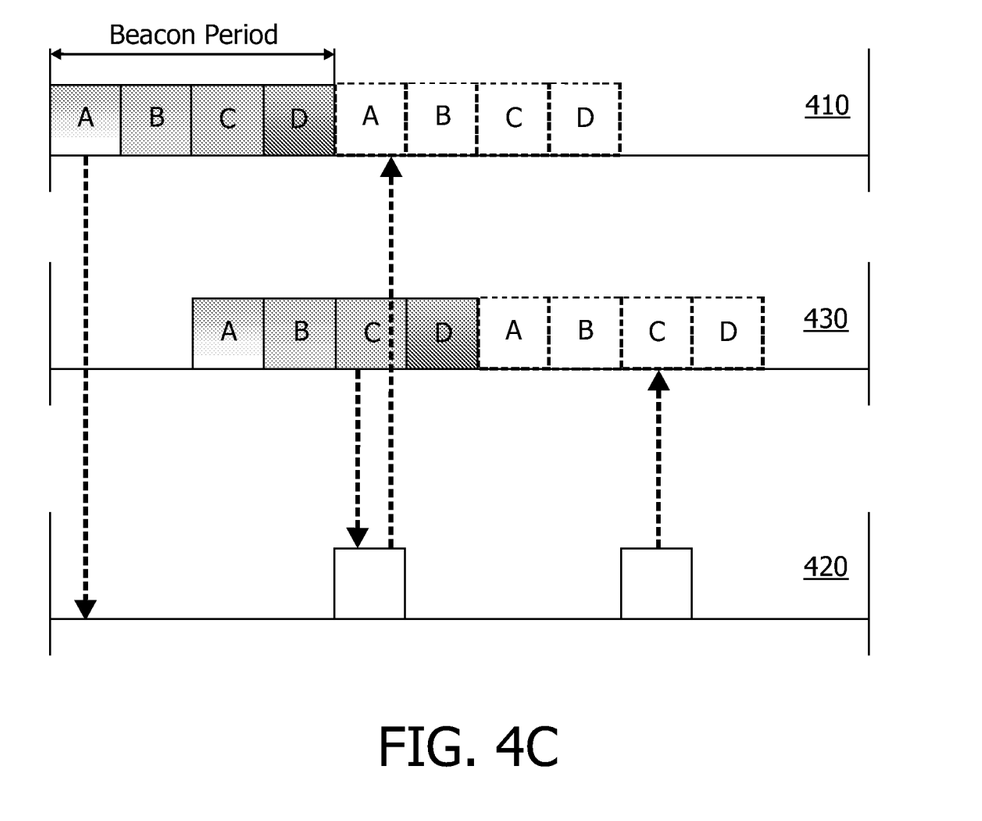

FIGS. 4A, 4B and 4C are block diagrams of operational time lines 410, 420 and 430, which respectively correspond to signals sent and/or received by wireless devices 210, 220 and 230. Each time line indicates one beacon period of corresponding superframe (not shown), according to various embodiments.

Each timeline 410-430 includes a series of consecutive blocks or time slots within a beacon period, which represent fixed periods of time associated with the beaconing process. For example, time line 410 shows a beacon period having four beacon slots, slots A-D, which correspond to antenna sectors A-D of wireless device 210. The shaded beacon slots indicate primary beacon slots in which primary beacons are actively transmitted. The beacon slots A-D indicated by dashed lines represent the secondary/response beacon slots for the corresponding sectors, as specified in the corresponding primary beacons of wireless device 210. Likewise, time line 430 shows beacon periods having primary and secondary beacon slots A-D corresponding to antenna sectors A-D of wireless device 230. Time line 420 shows individual beacon slots in which wireless device 220 sends responsive beacons to each of wireless devices 210 and 230.

The time slots may vary in size, without departing from the spirit and scope of the embodiments. For example, the number of slots per superframe and/or length of time of each time slot may be configured to provide unique benefits for any particular situation or to meet various design requirements. Also, antenna directivity and beacon periods have not been pre-coordinated or otherwise synchronized among the wireless devices 210, 220 and 230.

The dashed arrows pointing downward indicate primary beacons being sent by the primary wireless devices 210 and 230 to the secondary wireless device 220. The dashed arrows pointing upward indicate responsive secondary beacons being sent by the second wireless device 220 to the primary wireless devices 210 and 230. As discussed above with respect to FIG. 2, wireless device 210 is only able to communicate with wireless device 220 in antenna sector A, due to the wireless devices' relative locations. Therefore, the dashed arrows show wireless device 210 sending primary beacons and receiving secondary beacons only in sector A of timeline 410. Likewise, wireless device 230 is only able to communicate with wireless device 220 in antenna sector C, due to the wireless devices' relative locations. Therefore, the dashed arrows show wireless device 230 sending primary beacons and receiving secondary beacons only in sector C of timeline 430.

Because wireless devices 210, 220 and 230 are not synchronized, the time periods for exchanging beacons may or may not overlap. For example, FIG. 4A depicts a scenario in which the timing works out, such that the primary beacons sent by wireless device 210 (time line 410) and wireless device 230 (time line 430) do not interfere with one another and do not interfere with the respective secondary beacons sent by wireless device 220 (time line 420). In other words, the time during which wireless device 210 sends/receives primary and secondary beacons in its antenna sector A does not overlap with the time during which wireless device 230 sends/receives primary and secondary beacons in its antenna sector C. Thus, wireless device 220 does not need to adjust its timing.

In contrast, FIG. 4B depicts a scenario in which the timing of sending primary beacons and receiving secondary beacons completely overlaps. In other words, the time during which wireless device 210 sends/receives primary and secondary beacons in its antenna sector A is the same as the time during which wireless device 230 sends/receives primary and secondary beacons in its antenna sector C. Similarly, FIG. 4C depicts a scenario in which the timing of sending primary beacons and receiving secondary beacons partially overlaps. In other words, the time during which wireless device 210 receives secondary beacons in its antenna sector A is the same as the time during which wireless device 230 sends primary beacons in its antenna sector C. Accordingly, in response to the scenarios of FIGS. 4B and 4C, secondary wireless device 220 must coordinate between the primary wireless devices to maintain communications over the network 200 and to avoid partitioning after wireless device 230 has been discovered and joined to wireless devices 210 and 220, as discussed below.

Figure 5:
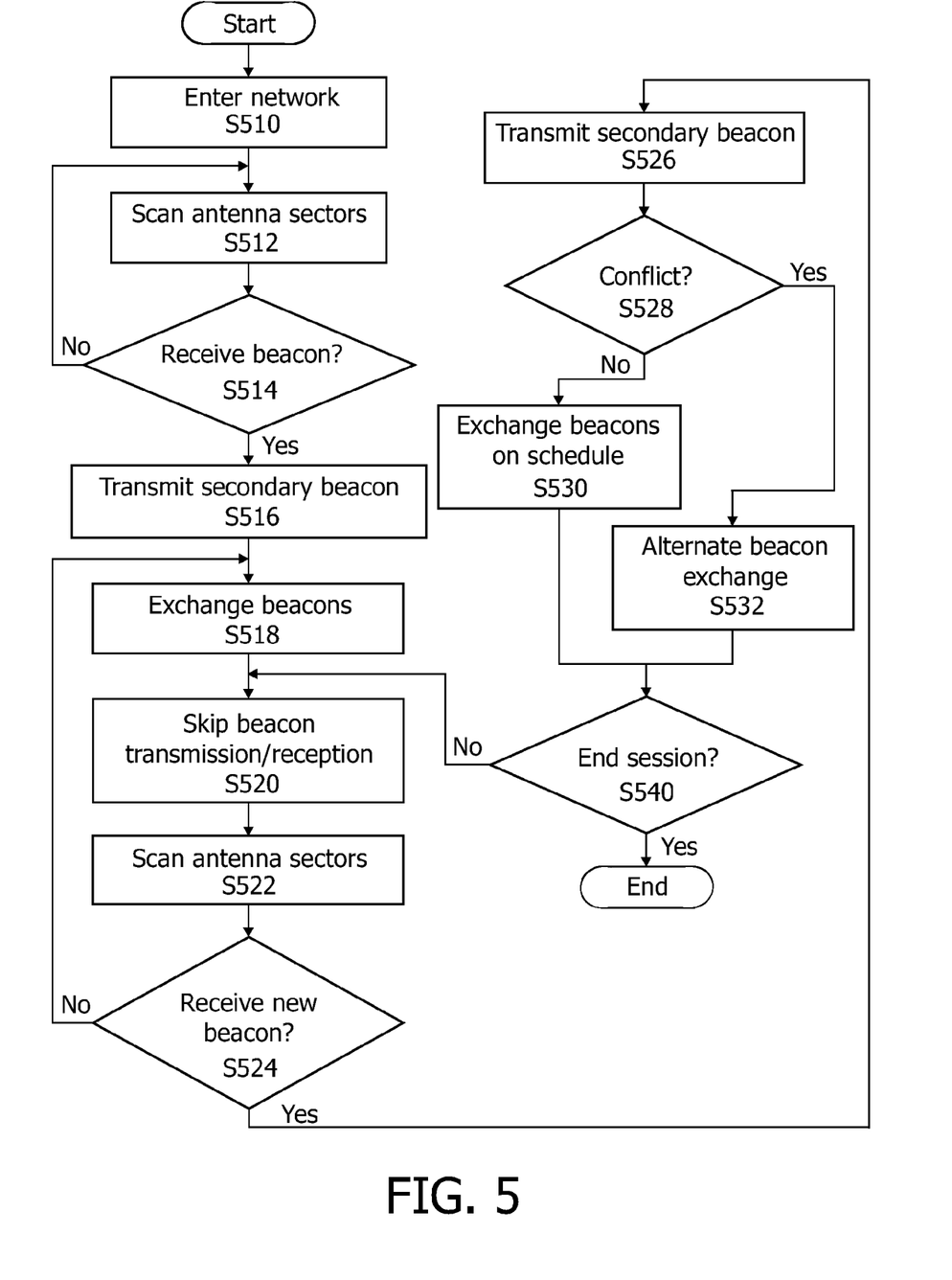
FIG. 5 is a flow chart of a wireless device discovery process according to various embodiments.

FIG. 5 is a flow diagram showing a process for discovering hidden nodes and coordinating beacon transmission and reception using directional antennas, according to an embodiment. The process steps of FIG. 5 will be discussed, in part, with reference to the time lines 410-430 of FIGS. 4A-4C.

At step S510, wireless device 220 enters the network 200, for example, by powering on. It is assumed that the wireless device 210 is already on and transmitting primary beacons in slots A-D (e.g., of FIG. 4A) in each of its corresponding antenna sectors A-D. Wireless device 220 scans all of its sectors A-D listening for primary beacons in the beacon period slots corresponding at step S512. Each beacon transmitted by the primary wireless device 210 includes information, such as the number, location and/or corresponding sector number of beacon slot(s) in which the a receiving secondary wireless device should send a responsive secondary beacon.

When wireless device 220 does not receive a primary beacon (step S514: No), it continues to scan all antenna sectors, repeating step S512. When wireless device 220 detects a primary beacon (step S514: Yes), it transmits a responsive secondary beacon at step S516. The secondary beacon is transmitted in the antenna sector (e.g., sector C) of wireless device 220 directed toward wireless device 210. Wireless device 220 thus joins wireless device 210, and wireless devices 210 and 220 then continue to exchange beacons at step S518, maintaining a communications session between the two devices.

At step A520, wireless device 220 skips receiving a primary beacon from wireless device 210 and/or transmitting a secondary beacon to wireless device 210. This enables wireless device 220 to scan all of its antenna sectors at step S522 and listen for other beacons, such as a primary beacon from wireless device 230. The timing of when wireless device 220 skips receiving/transmitting beacons may vary. The wireless device may skip receiving/transmitting beacons at regular or periodic intervals, e.g., set according to a predetermined schedule, or the wireless device may skip receiving/transmitting beacons irregularly or randomly. For example, wireless device 220 may skip receiving every other beacon (and thus transmit every other responsive beacon) to scan other antenna sectors. Alternatively, wireless device 220 may skip receiving every number of beacons (e.g., every second, third, fiftieth, etc., beacon), depending on how often it is desired for wireless device 220 to check for other wireless devices. Also, the timing of when wireless device 220 skips receiving/transmitting beacons may vary depending on the number of primary wireless devices with which it is joined. For example, if wireless device 220 is already associated with two primary wireless devices, it must periodically skip receiving/transmitting beacons with respect to both primary wireless devices in order to scan its antenna sectors at step S52. This may result in wireless device 220 exchanging beacons less frequency with both primary wireless devices.

At step S524, wireless device 220 determines whether it has received a new beacon (e.g., a beacon from a wireless device other than wireless device 210). When it has not received a new beacon (S524: No), wireless device 220 returns to step S518, continuing to exchange beacons with wireless device 210 and periodically or randomly skipping the beacon exchange at steps S518 and S520. When wireless device 220 receives a new beacon (e.g., a primary beacon from wireless device 230) (step S524: Yes), it transmits a responsive beacon at step S526 in the antenna sector in which the new beacon was received.

At this point, wireless device 220 learns information regarding communications with wireless device 230 based on the timing of the new beacon and information contained in the beacon. Wireless device 220 therefore knows the schedule according to which it must exchange beacons with wireless device 230. At step S528, wireless device 220 compares the schedule with the original schedule of beacon exchanges with wireless device 210 and determines whether the schedules conflict. For example, FIGS. 4B and 4C depict scenarios in which the beacon receive/transmit schedules conflict. As discussed above, FIG. 4B shows that wireless device 220 would have to receive beacons from and send responsive beacons to both wireless devices 210 and 230 in the same time periods, and FIG. 4C shows that wireless device 220 would have to transmit a responsive beacon to wireless device 210 in the same time period that it would receive a beacon from wireless device 230. These scenarios create conflicts because, for example, wireless device 220 would not only have to simultaneously receive/transmit beacons from different devices, but it would have to have its directional antenna pointed in different directions.

Therefore, when wireless device 220 determines that there is a conflict between beacon exchanges (step S528: Yes), it proceeds to alternate beacon exchanges with wireless device 210 and wireless device 230 at step S532. For example, in the illustrative scenario depicted in FIG. 4B, wireless device 220 skips receiving a primary beacon from wireless device 210 to receive (and respond to) a primary beacon from wireless device 230, and wireless device 220 skips receiving a primary beacon from wireless device 230 to receive (and respond to) a primary beacon from wireless device 210. In the illustrative scenario depicted in FIG. 4C, wireless device 220 skips sending a responsive beacon to wireless device 210 in order to receive (and respond to) a primary beacon form wireless device 230.

Skipping beacon transmission/reception (e.g., to avoid conflicting timing and/or to periodically scan antenna sectors) will not effect the communication session between the wireless devices as long as successful beacon exchanges are accomplished within a predetermined timeframe set for the wireless network 200, which is typically adjustable. When there is no conflict (step S528: No), wireless device 220 exchanges beacons with both wireless devices 210 and 230 without alternating between the devices at step S530.

As long as the communication session(s) continues (step S540: No), wireless device 220 will return to step S520 and continue to regularly or randomly skip beacon exchanges with all associated primary wireless devices (e.g., wireless devices 210 and 230), adding additional wireless devices as new beacons are detected. The process ends when the communication session(s) ends (step S540: Yes). In various embodiments, wireless device 220 may stop scanning for additional beacons based on other criteria. For example, wireless device 220 may be programmed to discontinue sector scanning once it has joined with a predetermined number of wireless devices (e.g., four wireless devices or one in each antenna sector).

According to the exemplary embodiments, neighboring wireless devices, such as representative wireless devices 210, 220 and 230, are able to discover one another and rendezvous, e.g., for purposes of exchanging information and/or aiming antennas, without synchronizing time schedules. Therefore, wireless devices in proximity, regardless of topology will be well connected and the network will not be partitioned. This approach can be applied, for example, to assist devices using directional antennas in locating each other. Examples are provided herein for illustration purposes and are not to be construed as limiting the scope of the teachings of this specification, or the claims to follow.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of discovering hidden wireless devices in a wireless network using a directional antenna system, preventing partitioning of the wireless network, the method comprising:

joining a first wireless device located in a first antenna sector in response to an initial first beacon received from the first wireless device;

receiving a plurality of first beacons from the joined first wireless device during a corresponding plurality of first beacon periods;

scanning at least a second antenna sector during at least one first beacon period of the plurality of first beacon periods to listen for second beacons from a second wireless device in the second antenna sector, while remaining joined with the first wireless device;

receiving an initial second beacon from the second wireless device while scanning the second antenna sector;

joining the second wireless device in response to the initial second beacon; and receiving a plurality of second beacons from the joined second wireless device during a corresponding plurality of second beacon periods, and continuing to receive at least a portion of the plurality of first beacons, wherein the first beacons are not received while scanning at least the second antenna sector, and wherein when the first beacon periods occur at the same times as the second beacon periods, the method further comprises:

alternating between receiving the first beacons and the second beacons.

2. The method of claim 1, further comprising:

sending a plurality of first response beacons to the joined first wireless device in response the received first beacons, wherein the first response beacons are not sent while scanning at least the second antenna sector.

3. The method of claim 1, wherein when the first beacon periods occur at different times than the second beacon periods, the method further comprises:

receiving each of the first beacons and the second beacons.

4. The method of claim 1, further comprising:
sending a plurality of second response beacons to the joined second wireless device in response the received second beacons.

5. The method of claim 4, wherein when sending the first response beacons occurs at the same times as the second beacon periods, the method further comprises:
alternating between sending the first response beacons and receiving the second beacons.

6. The method of claim 4, wherein when sending the second response beacons occurs at the same times as the first beacon periods, the method further comprises:
alternating between sending the second response beacons and receiving the first beacons.

7. The method of claim 1, further comprising:
scanning at least a third antenna sector during one first beacon period of the plurality of first beacon periods and one second beacon period of the plurality of second beacon periods to listen for third primary beacons, while remaining joined with the first wireless device and the second wireless device,
wherein the first beacons and the second beacons are not received while the third antenna sector is being scanned.

8. The method of claim 1, wherein scanning the second antenna sector comprises sweeping a beam of the directional antenna system.

9. An apparatus configured to communicate with a plurality of wireless devices through a wireless network, where the apparatus is initially joined with a first wireless device located in a first antenna sector of a plurality of antenna sectors, the apparatus comprising:
a directional antenna system configured to communicate over the wireless network in the plurality of antenna sectors;
a transceiver configured to receive a plurality of first beacons from the joined first wireless device via the antenna system during a corresponding plurality of first beacon periods; and
a processor configured to control the antenna system to scan at least a second antenna sector of the plurality of antenna sectors during at least one first beacon period of the plurality of first beacon periods to listen for beacons from the plurality of wireless devices,
wherein the first beacons are not received while the directional antenna system is scanning, and the apparatus remains joined with the first wireless device,
wherein the transceiver receives an initial second beacon from a second wireless device located in the second antenna sector while the antenna system is scanning, enabling the apparatus to join with the second wireless device,
wherein the transceiver receives a plurality of second beacons from the joined second wireless device during a corresponding plurality of second beacon periods, and continues to receive at least a portion of the plurality of first primary beacons, and
wherein when the first beacon periods occur at the same times as the second beacon periods, the transceiver alternates between receiving the first primary beacons and the second primary beacons.

10. The apparatus method of claim 9, wherein the antenna system comprises one of an antenna array or a steerable antenna.

11. The apparatus of claim 9, wherein when the first beacon periods occur at different times than the second beacon periods, the transceiver receives each of the first primary beacons and the second primary beacons.

12. The apparatus of claim 9, wherein the transceiver sends a plurality of first response beacons to the joined first wireless device in response the received first beacons and sends a plurality of second response beacons to the joined second wireless device in response the received second beacons; and
wherein the first response beacons are not sent while the antenna system scans the antenna sectors.

13. The apparatus of claim 12, wherein when sending the first response beacons occurs at the same times as the second beacon periods, the transceiver alternates between sending the first response beacons and receiving the second beacons.

14. The apparatus of claim 12, wherein when sending the second response beacons occurs at the same times as the first beacon periods, the transceiver alternates between sending the second response beacons and receiving the first beacons.

15. A method of enabling a secondary wireless device to discover a plurality of primary wireless devices through a wireless network, where activation schedules of the secondary wireless device and the primary wireless devices are not synchronized, the method comprising:
receiving first primary beacons from a first primary wireless device in a first antenna sector and sending first secondary beacons to the first primary wireless device in response;
skipping receiving the first primary beacons from the first primary wireless device;
scanning other antenna sectors and listening for additional primary beacons while skipping receiving the first primary beacons;
receiving an initial second primary beacon from a second primary wireless device in a second antenna sector while scanning the antenna sectors and sending an initial second secondary beacon to the second primary wireless device in response; and
receiving second primary beacons from the second primary wireless device and sending secondary beacons to the second primary wireless device in response, in addition to receiving the first primary beacons from a first primary wireless device and sending the first secondary beacons to the first primary wireless device in response, wherein the first primary beacons are received during a first time period and the second primary beacons are received during a second time period; and
wherein when the first time period conflicts with the second time period, the method further comprises alternating receiving the first primary beacons and the second primary beacons.

* * * * *